United States Patent Office 2,880,773
Patented Apr. 7, 1959

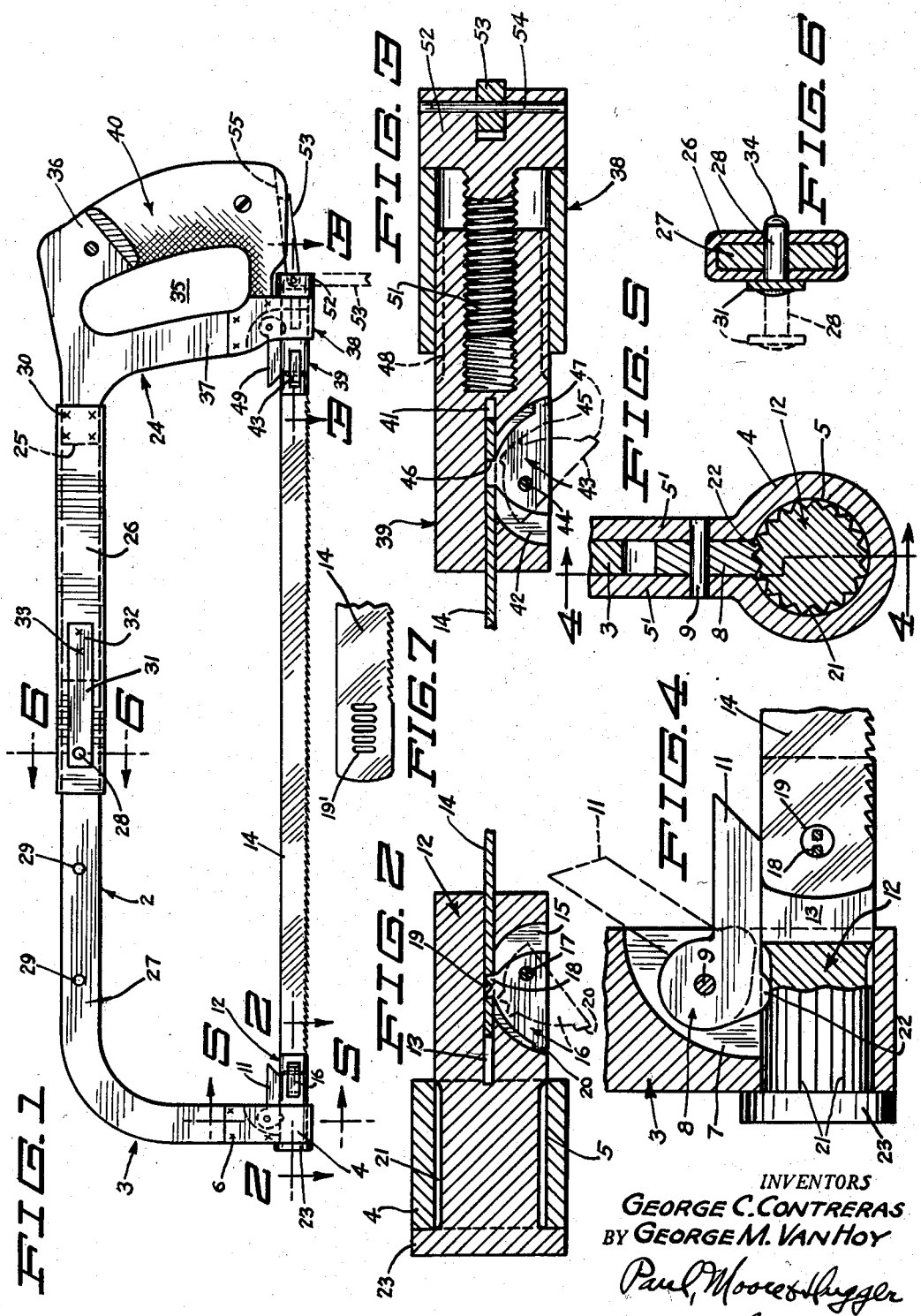

2,880,773

HACK SAW

George C. Contreras and George M. Van Hoy, Murrieta, Calif.

Application October 20, 1955, Serial No. 541,560

2 Claims. (Cl. 145—34)

This invention relates to new and useful improvements in hack saws and particularly to the means for detachably securing the blade to its supporting frame.

An object of the present invention resides in the provision of a hack saw having means embodied in the frame thereof for detachably securing the blade therein, and whereby the blade may be rotatively adjusted in the frame to facilitate various cutting operations.

A further object of the invention is to provide a hack saw comprising front and rear frame sections provided at their lower extremities with axially aligned bores, each adapted to receive a cylindrical plug, and said plugs having the portions thereof which are supported in said bores, longitudinally grooved or serrated circumferentially thereof, and means being provided in said frame members adjacent to said bores for engaging the serrated portions of said plugs to lock them against relative rotation in their respective bores.

A further object of the invention is to provide a hack saw having front and rear frame sections having axially aligned cylindrical bores in their lower extremities adapted to adjustably receive opposed cylindrical plugs having their inner end portions transversely slitted from the ends thereof for receiving the opposite ends of a saw blade, and a pivoted element being mounted in each plug and each having a portion arranged to traverse its respective slot and engage the end of the saw blade to detachably secure the saw blade in the saw frame, said pivoted elements being substantially concealed within their respective plugs when in normal blade-securing positions.

Other objects of the invention reside in the simple and inexpensive construction of the blade-securing means, including the cylindrical plugs and the eccentric elements mounted therein for detachably securing the ends of the saw blade thereto; in the construction of the latch members mounted adjacent to the cylindrical bores in the saw frame and having projections thereon receivable in the serrations in said plugs, thereby to secure them in adjusted rotative positions; in the means provided in one of said plugs for longitudinally adjusting it in its supporting bore, thereby to tension the saw blade in its supporting frame; and in the novel means provided for longitudinally adjusting the saw frame to quickly adapt the saw for saw blades of different lengths.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a side elevation of our improved hack saw;

Figure 2 is an enlarged detail sectional view on the line 2—2 of Figure 1, showing the eccentric element provided at the forward end of the saw frame for detachably securing the saw thereto;

Figure 3 is an enlarged detail sectional view on the line 3—3 of Figure 1, showing the construction and mounting of the blade supporting plug provided in the rear frame section, and its eccentric element operatively engaged with the adjacent end of the saw blade, and also showing the adjusting screw for tensioning the saw blade;

Figure 4 is a detail sectional view on the line 4—4 of Figure 5, showing the latch member at the forward end of the saw in locking position with its respective blade supporting plug, the dotted lines indicating the position of the latch when disengaged from the plug to permit the latter to be rotatively adjusted in its supporting bore;

Figure 5 is an enlarged detail sectional view on the line 5—5 of Figure 1;

Figure 6 is an enlarged detail sectional view on the line 6—6 of Figure 1, showing the locking pin for adjustably securing the front and rear frame sections in adjusted position; and Figure 7 shows a sawblade of slightly modified construction wherein a plurality of closely spaced slots or corrugations have been substituted for the apertures usually provided at the ends of the saw blade.

The novel hack saw herein disclosed is shown comprising a front frame section 2 having a downwardly extending leg 3 to the lower extremity of which is suitably secured a bearing sleeve or member 4, having a cylindrical bore 5 therein extending lengthwise therethrough. Bearing sleeve 4 is shown provided with upwardly extending strap-like portions 5' which engage opposite sides of the lower extremity of leg 3 and may be secured thereto by such means as spot welding, indicated at 6 in Figure 1.

The lower extremity of leg 3 has a portion thereof cut away, as best indicated in Figure 4, to provide a recess 7, the side walls of which are formed by the strap-like members 5'—5' of bearing sleeve 4. Recess 7 is open at its inner side and has mounted therein a latch member 8, which is pivotally supported upon a pivot pin 9, whereby the latch member may be relatively rotated thereon, as will be understood by reference to the full and dotted lines shown in Figure 4.

The latch member 8 has an operating handle 11 positioned exteriorly of recess 7, whereby it may readily and conveniently be manipulated by the operator's fingers, for reasons subsequently to be described.

Mounted within the cylindrical bore 5 is a saw blade supporting plug, generally designated by the numeral 12. The inner end portion of plug 12 is longitudinally slotted from the end thereof, as indicated at 13 in Figure 21, to receive one end of a saw blade 14.

The inner cylindrical end portion of plug 12 has a second slot 15 therein disposed at right angles to slot 13, and having its bottom end communicating with slot 13. Mounted within slot 15 is an eccentric element 16 which is pivoted at 17 to plug 12. Eccentric element 16 is shown having a bifurcated peripheral projection 18 adapted to enter a suitable aperture 19 provided in the adjacent end of saw blade 14, when the eccentric element 16 is in locking engagement with the saw blade, as shown in full lines in Figure 2.

The eccentric element may be provided with a detent 20 on its long end, adapted to engage the adjacent end wall of slot 15, thereby to properly position the projection 18 in locking engagement with the saw blade. This may not be necessary, however, because of the eccentric action of element 16 which causes the projection or lug 18 to firmly engage the opposite wall of slot 13 through aperture 19, when the saw blade is placed under tension.

Eccentric 16, when in saw blade locking position within recess or slot 15, is substantially concealed within its supporting plug 12, with its exposed edge positioned within the confines of the plug so that the latter may readily be slid in and out of bore 5, as will be understood by reference to Figure 2.

Some saw blades may be provided at one or both ends with a plurality of closely spaced parallel slots or corrugations 19', in lieu of aperture 19, as shown in Figure 7. When such a saw blade is used, the slots or corrugations 19' will serve as a rack bar, and the spaced teeth of the bifurcated lug 18 will enter therein in much the same way as a conventional rack-and-pinion.

Another important feature of the invention resides in the means provided for retaining plug 12 in adjusted rotative position within its bearing sleeve 4. Such means is shown comprising a plurality of longitudinally extending serrations or grooves 21 provided in the periphery of plug 12, in that portion thereof which normally is positioned within bore 5. The serrations or grooves 21 are uniformly spaced around the circumference of the plug, as best illustrated in Figure 5.

To secure the plug against relative rotation in the bore 5, latch member 8 is shown formed with projections or teeth 22 positioned to lockingly engage the serrations 21 in the periphery of plug 12, when latch member 8 is in locking position, as shown in full lines in Figures 4 and 5. Plug 12 has a head 23 at its forward or outer end for retaining the plug in proper position in leg 3, when a saw blade is secured in the frame.

The composite saw blade supporting frame also comprises a rear frame section 24 having a forward extension 25 to which is secured an elongated tubular or box-like member 26, by such means as welding, indicated at 30. The opposite end of member 26 is open to receive the rearwardly directed strap-like member 27 of the front frame section 3.

Means is provided for adjustably securing the strap-like end portion 27 of frame member 3 in member 26, and is shown comprising a locking pin 28 adapted to traverse aligned apertures provided in the box-like member 26, and a selected aperture 29 in the portion 27 of the front frame section 3, as shown in Figure 1.

Locking pin 28 is fixed to one end of a leaf spring 31, the opposite end 32 of which is fixedly secured to the box-like member 26, as indicated at 33 in Figure 1. Spring 31 normally retains pin 28 in locking engagement with the rearwardly extending portion 27 of front frame section 3, and may readily be withdrawn from locking engagement with frame part 27 by applying a slight pressure to the terminal 34 of the locking pin, whereby the operator may readily grasp the leaf spring 31 and outwardly pull it to the dotted line position shown in Figure 6. When so positioned, the front and rear frame sections are released from one another and may then be telescopically adjusted to adapt the composite saw frame to receive a saw blade of a given length.

The rear end of the saw blade is adjustably secured to the rear frame section 24 by means similar to that employed for securing the front end thereof to frame section 2. Rear frame section 24 is in the form of an enlarged metallic stamping, and has an aperture 35 therein which separates the rear portion 36 of the frame member 24 from its front portion 37, whereby the rear portion 36 provides, in effect, a hand grip for the operator. Suitable grip portions 40, preferably of wood, are shown secured to the rear portion 36 of frame member 24, and cooperate therewith to provide a convenient hand grip for the operator, as is common in structures of this general type.

Secured to the lower extremity of the rear frame section 24 is a bearing sleeve 38 which, generally, is similar in construction to bearing sleeve 4 secured to the front frame section 2, and is secured to frame section 24 in a similar manner.

Slidably and rotatably mounted within bearing sleeve 38 is a cylindrical plug, generally designated by the numeral 39. The forward end of plug 39 is similar in construction to plug 12, and has an axially disposed slot 41 therein adapted to receive the adjacent end of saw blade 14. A second slot 42 is provided in plug 39 and is disposed in right angular relation to slot 41 with its bottom in communication with slot 41, as clearly illustrated in Figure 3.

An eccentric element 43 is mounted in slot 42 and is pivotally supported therein by a pivot pin 44. Eccentric 43 has a detent 45 on its periphery adapted to interlock with an aperture 46 provided in the adjacent end of the saw blade, thereby to lock the saw blade in the slot 41. An abutment lug 47 may be provided on the rear end of eccentric 43 adapted to engage the adjacent end wall of slot 42 to properly position the detent or lug 45 in clamping engagement with the saw blade, when the eccentric element is in saw blade locking position. In some instances it may be deemed more desirable to omit abutment lug 47, because of the eccentric action of eccentric 43.

The periphery of the rear end of plug 39 is longitudinally serrated or grooved, as indicated at 48 in Figure 3, whereby a latch member 49, similar to latch member 11 at the forward end of the saw, may interlock with said serrations, thereby to secure the plug 39 against relative rotation in bearing sleeve 38, when the blade is operatively secured in the saw.

Means is provided for tensioning the saw blade, and is shown comprising an adjusting screw 51 having its inner end received in threaded engagement with plug 39, and having a suitable head 52 at its rear or outer end. Head 52 is normally seated against the adjacent end of bearing sleeve 38, and has an operating handle 53 pivoted thereto by a suitable pivot pin 54. The operating handle 53 is normally positioned in a recess 55 provided in the lower end of handle 40, whereby it is not likely to interfere with the operator's hand or fingers when manipulating the saw. By relatively rotating the adjusting screw 51 by manipulation of its exposed head 52 by handle 53, plug 39 may readily be axially adjusted in the bore in bearing sleeve 38 to vary the tension in the sawblade, as may be necessary.

The novel hack saw herein disclosed has proven extremely practical and efficient in operation. The provision of the sawblade supporting plugs 12 and 39, and the means provided for securing said plugs against relative rotation in their respective bearings or sleeve members 4 and 38, serves to securely retain the saw blade in operative position in the saw frame, whereby it cannot move relative thereto, when the saw is in operation.

Latch members 11 and 49, in conjunction with the serrated end portions of their respective sawblade supporting plugs 12 and 39, permits the blade to be rotatively adjusted in the saw frame at any time, without removing the blade from the frame, thereby making it possible to quickly rotatably adjust the blade in the saw frame to adapt the saw for many various cutting operations.

To thus relatively adjust the blade in the saw frame, the operator simply slightly releases the tension in the sawblade by a slight rotation of the tension screw 51, after which the latch members 11 and 49 may be freely swung out of locking engagement with their respective plugs 12 and 39, as indicated in dotted lines in Figure 4, whereby the plugs 12 and 39 are released for relative rotation within their respective bores. The construction of plugs 12 and 39 and their novel mounting in the saw frame is such that the sawblade may be rotated to any desired angle relative to the saw frame, and when adjusted to the selected angle may be quickly secured against relative rotation in the frame by the simple manipulation of the latch members 11 and 49 and the tension screw 51.

In like manner, when the blade is to be removed from the saw frame, as when substituting one blade for another, it is only necessary to slightly release the tension in the sawblade by manipulation of the tension screw 51, after which the eccentric elements 16 and 45 may be freely swung out of locking engagement with the ends of the sawblade, as indicated by the dotted lines in Figures 2 and 3. When the eccentric elements are so positioned, the sawblade is completely released from its supporting plugs 12 and 39, as will readily be understood. The construction of the various parts of the composite saw are extremely simple and inexpensive to fabricate and assemble, whereby the saw may be manufactured in quantity production at extremely low cost.

The foregoing detailed description has been given for clearness of understanding only, and no unnecessary limitations should be understood therefrom, and the appended claims should be construed as broadly as permissible in view of the prior art.

We claim as our invention:

1. In a hack saw, a composite frame comprising front and rear sections, means for adjustably securing together said sections whereby the length of the composite frame may be varied to adapt it for saw blades of different lengths, a tubular bearing sleeve secured to the lower extremity of each frame section, a cylindrical plug rotatably received in the bearing sleeve in the front frame section, said plug having a head at its outer end normally abuttingly engaged with the outer end of the bearing sleeve, the portion of said plug within the bearing sleeve having its periphery longitudinally grooved, said front frame section having a recess therein communicating with the bore in said bearing sleeve, a latch member pivoted in said recess and having a depending projection receivable in one of the grooves in said plug, thereby to secure the plug against relative rotation in the bearing sleeve, means for detachably securing one end of the saw blade to said plug, a cylindrical plug mounted for rotary adjustment in the bearing sleeve of the rear frame section, said second plug having its inner end similarly slotted to receive and support the opposite end of the saw blade, an adjusting screw received in threaded engagement with the rear end of said second plug and having an enlarged head seated against the outer end of the rear bearing sleeve, the portion of said second plug disposed within the bore in said rear bearing sleeve having its periphery longitudinally grooved for interlocking engagement with a latch member in said rear frame member, thereby to prevent relative rotation of said second plug in its bearing sleeve, means for detachably securing the opposite end of the saw blade to said second plug, and means for relatively rotating said adjusting screw to tension the saw blade in said frame.

2. In a hack saw, a composite frame comprising front and rear sections, means for adjustably securing together said sections whereby the length of the composite frame may be varied to adapt it for saw blades of different lengths, a tubular bearing sleeve secured to the lower extremity of each frame section, a cylindrical plug rotatably received in the bearing sleeve in the front frame section, said plug having a head at its outer end normally abuttingly engaged with the outer end of the bearing sleeve, the portion of said plug within the bearing sleeve having its periphery longitudinally grooved, said front frame section having a recess therein communicating with the bore in said bearing sleeve, a latch member pivoted in said recess and having a depending projection receivable in one of the grooves in said plug, thereby to secure the plug against relative rotation in the bearing sleeve, means for detachably securing one end of the saw blade to said plug, a cylindrical plug mounted for rotary adjustment in the bearing sleeve of the rear frame section, said second plug having its inner end similarly slotted to receive the rear end of the saw blade, means connected to said second plug and engaged with the lower extremity of the rear frame section and being movable axially to translate said second plug in its supporting sleeve to tension or free the saw blade, the portion of said second plug disposed within the bore in said rear bearing sleeve having its periphery longitudinally grooved for interlocking engagement with a latch member in said rear frame member, thereby to prevent relative rotation of said second plug in its bearing sleeve, means for detachably securing the rear end of the saw blade to said second plug, and means for axially translating said rear plug in its bearing sleeve, thereby to tension the saw blade in said frame.

References Cited in the file of this patent

UNITED STATES PATENTS

| | | |
|---|---|---|
| 72,498 | Inman | Dec. 24, 1867 |
| 440,174 | Marston | Nov. 11, 1890 |
| 487,358 | Whelpley | Dec. 6, 1892 |
| 1,561,660 | Peck | Nov. 17, 1925 |
| 1,865,026 | Loza | June 28, 1932 |
| 2,116,137 | Biester | May 3, 1938 |
| 2,715,426 | Morris | Aug. 16, 1955 |

FOREIGN PATENTS

| | | |
|---|---|---|
| 142,623 | Great Britain | May 13, 1920 |
| 586,078 | Great Britain | Aug. 6, 1947 |